United States Patent [19]

Murakami et al.

[11] Patent Number: 4,721,360
[45] Date of Patent: Jan. 26, 1988

[54] INFRARED LIGHT TRANSMITTING FIBER

[75] Inventors: Kazuhito Murakami; Kenichi Takahashi, both of Osaka, Japan

[73] Assignee: Sumitomo Electric Industries, Ltd., Osaka, Japan

[21] Appl. No.: 262,877

[22] Filed: May 12, 1981

[30] Foreign Application Priority Data

May 12, 1980 [JP] Japan .................. 55-62630

[51] Int. Cl.⁴ .............................................. G02B 6/00
[52] U.S. Cl. ................................................. 350/96.34
[58] Field of Search ............... 350/96.29, 96.30, 96.34, 350/1.1

[56] References Cited

U.S. PATENT DOCUMENTS

| | | | |
|---|---|---|---|
| 4,171,400 | 10/1979 | Rosette et al. | 350/1.1 X |
| 4,188,089 | 2/1980 | Gliemeroth et al. | 350/96.34 |
| 4,189,208 | 2/1980 | Grodkiewicz et al. | 350/96.34 |
| 4,253,731 | 3/1981 | Anderson et al. | 350/96.34 |
| 4,315,667 | 2/1982 | Nakagome et al. | 350/96.34 |

FOREIGN PATENT DOCUMENTS

| | | | |
|---|---|---|---|
| 2821642 | 11/1978 | Fed. Rep. of Germany | 350/96.34 |
| 0146402 | 11/1980 | Japan | 350/96.34 |

OTHER PUBLICATIONS

Kapany et al, "Infrared Fiber Optics", *ARF 1139-13 Quarterly Report(5) on Contract AF33(616)-6247*, Jun. 1960, pp. 1-10.
Artyushenko et al, "Thallium Halide Fiber Waveguides for Middle IR Range", *Sov. J. Quantum Elect.*, vol. 11, No. 2, Feb. 1981, pp. 239-240.
Krus et al, "Crystal Materials for Infrared Fibers", *Proc. of SPIE vol. 266: Infrared Fibers* (0.8-12 μm), Feb. 1981, pp. 71-77.

*Primary Examiner*—William L. Sikes
*Assistant Examiner*—Frank Gonzalez
*Attorney, Agent, or Firm*—Sughrue, Mion, Zinn, Macpeak & Seas

[57] ABSTRACT

An infrared light transmitting fiber is disclosed. The fiber is prepared by hot extruding an alkali metal halide, silver halide or thallium halide crystal containing an alkaline earth metal element.

12 Claims, 1 Drawing Figure

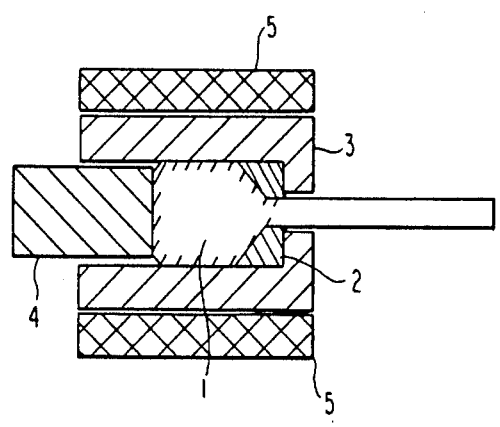

INFRARED LIGHT TRANSMITTING FIBER

FIELD OF THE INVENTION

This invention relates to an infrared light transmitting fiber.

BACKGROUND OF THE INVENTION

Infrared light transmitting fibers made of a single crystal or polycrystalline metal halide are known, but they generally have a lower break strength than quartz glass fibers. In the course of studies on a method for improving the mechanical strength of the fibers, we came to realize that since extrusion of a metal halide crystal produces a linear polycrystalline element, the metal halide fiber might be reinforced by reducing the size of crystal grains in the same manner as metals can be reinforced by reducing the size of its crystal grains. A silver halide or thallium halide crystal is ductile, but to provide a smooth surface and reduce the energy required for the subsequent working, it is hot extruded into a linear form. The cyrstal undergoes slip deformation into a polycrystalline product, but at the same time, large crystal grains are formed due to recrystallization. In addition, an alkali metal halide which is brittle at ordinary temperatures must be hot worked at elevated temperatures where plastic deformation occurs. The fiber so prepared consisted of large crystal grains having a size between 400 microns and 1 mm and had substantially the same mechanical properties as those of the single crystal, and hence the object of improving the mechanical properties of the fiber by reducing the size of its crystal grains could not be attained.

BRIEF DESCRIPTION OF THE DRAWING

FIGURE is a cross section of an extruding machine for preparing the infrared light transmitting fiber of this invention.

DETAILED DESCRIPTION OF THE INVENTION

In view of this result, we continued our studies and accomplished the infrared light transmitting fiber which is described herein. It is known that when an alkaline earth metal element is added to an alkali metal halide, silver halide or thallium halide crystal, a solid solution of the element reinforces the crystal and hence increases its rupture strength. We hot extruded an alkali metal halide, silver halide or thallium halide crystal containing an alkaline earth metal element and found that the resulting fiber consisted of smaller crystal grains than in the fiber produced by hot extruding the same crystal free of alkaline earth metal element under the same temperature conditions to achieve the same degree of extrusion. The crystal containing an alkaline earth metal had a higher break strength than the crystal containing no such metal. Since the alkaline earth metal element can be added in the form of a halide as assumed by the infrared ray transmitting material to which it is added, and because the purpose of reducing the size of the grains of the halide crystal can be achieved by adding as low as about 100 ppm of the alkaline earth metal element, there is no possibility of impairing the optical properties of the alkali metal halide, silver halide or thallium halide. It should be understood however that since a metal oxide or an anionic group such as $SO_4^{--}$ or $CO_3^{--}$ absorbs light rays in the infrared region, great care must be taken to prevent their entrance into the halide crystal.

Examples of alkali metal halides which can be used in the present invention are halides of sodium, potassium, rubidium or cesium.

The alkaline earth metal element can be used in the form of a halide thereof and examples of alkaline earth metal elements are magnesium, calcium, strontium or barium.

The term "halide" as used herein means fluoride, chloride, bromide or iodide.

The alkali metal halide, the silver halide or thallium halide and the alkaline earch metal halide are preferably those having the same halogen atom in the halide portion thereof. For example, when the alkali metal halide is an alkali metal chloride, the alkaline earth metal element is preferably added in the form of alkaline earth metal chloride. However, it should be understood that different halides can also be used without adverse effects.

When the alkali metal halide is used, the alkali metal halide and the alkaline earth metal element are preferably a combination of the metal halides of the same periods in the Periodic Table, i.e., a combination of halides of Na and Mg, K and Ca, Rb and Sr, or Cs and Ba, but a combination of metal halides in the different periods of the Periodic Table can also be used.

The alkaline earth metal element can be used at a proportion of about 5000 ppm or less, preferably 1000 ppm or less, in the fiber.

The present invention is further illustrated by the following Examples, but they are given for illustrative purpose only and not to be construed as limiting the scope of this invention.

EXAMPLE 1

To potassium chloride (as an alkali metal halide), 100 to 5000 ppm of calcium was added in the form of calcium chloride, and a cylindrical crystal of potassium chloride was prepared by the Bridgman method. The crystal billet was extruded through an extruding machine (as shown in FIGURE) at a temperature between 500° to 600° C. to make a polycrystalline fiber having a diameter of 1.0 mm. In FIGURE, the numeral 1 represents an extrusion die, 3 is an extrusion vessel, 4 is an extruding punch, and 5 is a heater.

EXAMPLE 2

To silver chloride (as silver halide), 100 to 5000 ppm of strontium was added in the form of strontium chloride, and a cylindrical crystal of the silver chloride was prepared by the Bridgman method. The resulting crystal was cut off at both ends and only the middle portion of uniform composition was used as an extrudable billet. The billet was hot extruded through an extruding machine (as shown in FIGURE) at a temperature between 180° C. and 350° C. into a polycrystalline fiber 1.0 mm in diameter.

The polycrystalline fibers of Examples 1 and 2 were subjected to a tensile test, and the results are shown in Table 1 together with the data for polycrystalline fibers prepared by extruding pure potassium chloride and silver chloride under the same conditions as used in Examples 1 and 2.

TABLE 1

Measurements of Tensile Strength of Polycrystalline Fibers

| Material | Pure single crystal *1 | Pure polycrystalline fiber | Examples *2 |
|---|---|---|---|
| Potassium chloride | 0.50 kg/mm$^2$ | 0.55 kg/mm$^2$ | 1.75 kg/mm$^2$ |
| Silver chloride | 2.20 kg/mm$^2$ | 2.30 kg/mm$^2$ | 3.20 kg/mm$^2$ |

*1: Each of the single crystals used in the measurement was 2.0 cm in diameter and 5 cm long.
*2: Polycrystalline fibers containing 1000 ppm of respective alkaline earth metal elements were used in the measurement.

The grain size of the crystals of the polycrystalline fibers prepared in Examples 1 and 2 was measured by observing a cross section of each fiber under an optical microscope, and the results are shown in Table 2 together with the data for pure polycrystalline fibers.

TABLE 2

Grain Size in a Cross Section of Polycrystalline Fibers

| Material | Pure Polycrystalline Fiber | Examples *3 |
|---|---|---|
| Potassium chloride | 300–500 μm | 5–30 μm |
| Silver chloride | 300–800 μm | 15–50 μm |

*3: As in Table 1, polycrystalline fibers containing 1000 ppm of respective alkaline earth metal elements were used in the measurement.

As demonstrated in Tables 1 and 2, the alkali metal halide and silver halide containing an alkaline earth metal element comprised fine crystal grains that produced polycrystlline fibers having increased tensile strength.

We also confirmed that like alkali metal halide, thallium halide containing an alkaline earth metal element could be processed into a polycrystalline fiber having fine crystal grains, and hence increased tensile strength.

The thus reinforced polycrystalline fiber with an alkaline earth metal element was in no way affected adversely with respect to its optical properties and could be used as a stable infrared light transmission fiber; when it was used to transmit CO$_2$ laser beams, the transmission loss was about 10% per meter that was equal to the value for the polycrystalline fiber having no alkaline earth metal element.

According to this invention, by extruding an alkali metal halide, silver halide or thallium halide crystal containing an alkaline earth metal element, a polycrystalline fiber comprising fine crystal grains and increased tensile strength is obtained. As demonstrated by the experimental data given above, this is because the fiber is reinforced by the combined effect of a solid solution of the alkaline earth metal element and the reduced size of crystal grains. To be more specific, the migration of the crystal boundaries produced by hot working is inhibited by the added alkaline earth metal element so as to retard the growth of the grains due to recrystallization. As a result, a durable and easy-to-handle fiber is formed.

This invention can be used as a fiber to be connected to a remote photodetector, particularly to an infrared light detector such as an infrared light alarm. The invention is also used as a fiber for directing an infrared light of high power such as CO$_2$ or CO laser beams to a laser heating or laser working machine in a remote or inaccessible site.

While the invention has been described in detail and with reference to specific embodiments thereof, it will be apparent to one skilled in the art that various changes and modifications can be made therein without departing from the spirit and scope thereof.

What is claimed is:

1. A fine polycrystalline infrared light transmitting fiber prepared by hot extrusion of an alkali metal halide of sodium, potassium, or rubidium having incorporated therein at least 100 ppm of an alkaline earth metal element.

2. The infrared light transmitting fiber according to claim 1, wherein said alkali metal halide is a fluoride, chloride, bromide or iodide of sodium, potassium, rubidium or cesium.

3. The infrared light transmitting fiber according to claim 1, wherein said alkaline earth metal element is magnesium, calcium, strontium or barium.

4. The infrared light transmitting fiber according to claim 1, wherein said alkaline earth metal element is incorporated into said alkali metal halide, silver halide or thallium halide in the form of a fluoride, chloride, bromide or iodide of the alkaline earth metal element.

5. The infrared light transmitting fiber according to claim 1, wherein said alkaline earth metal element is present at a proportion of 5000 ppm or less in said fiber.

6. The infrared light transmitting fiber according to claim 1 wherein said alkaline earth metal element is present at a proportion of 1,000 ppm or less in said fiber.

7. A fine polycrystalline infrared light transmitting optical fiber having a core prepared by hot extrusion of an alkali metal halide of sodium, potassium or rubidium, said core having incorporated therein a trace quantity of a dopant comprising a fluoride, chloride, bromide or iodide of calcium, strontium or barium.

8. The infrared light transmitting fiber according to claim 7, wherein said alkali metal halide is a fluoride, chloride, bromide or iodide.

9. The infrared light transmitting fiber according to claim 7, wherein said alkaline earth metal element is incorporated into said alkaline earth metal element is magnesium, calcium, stronium or barium.

10. The infrared light transmitting fiber according to claim 7, wherein said alkaline earth metal element is incorporated into said alkali metal halide in the form of a fluoride, chloride, bromide or iodide of the alkaline earth metal element.

11. The infrared light transmitting fiber according to claim 7, wherein said alkaline earth metal element is present at a proportion of 5000 ppm or less in said fiber.

12. The infrared light transmitting fiber according to claim 7, wherein said alkaline earth metal element is present at a proportion of 1,000 ppm or less in said fiber.

* * * * *